Sept. 2, 1941.  H. WIENAND  2,254,638
METHOD AND APPARATUS FOR MOLDING ARTIFICIAL TEETH
Filed July 12, 1938  2 Sheets-Sheet 1
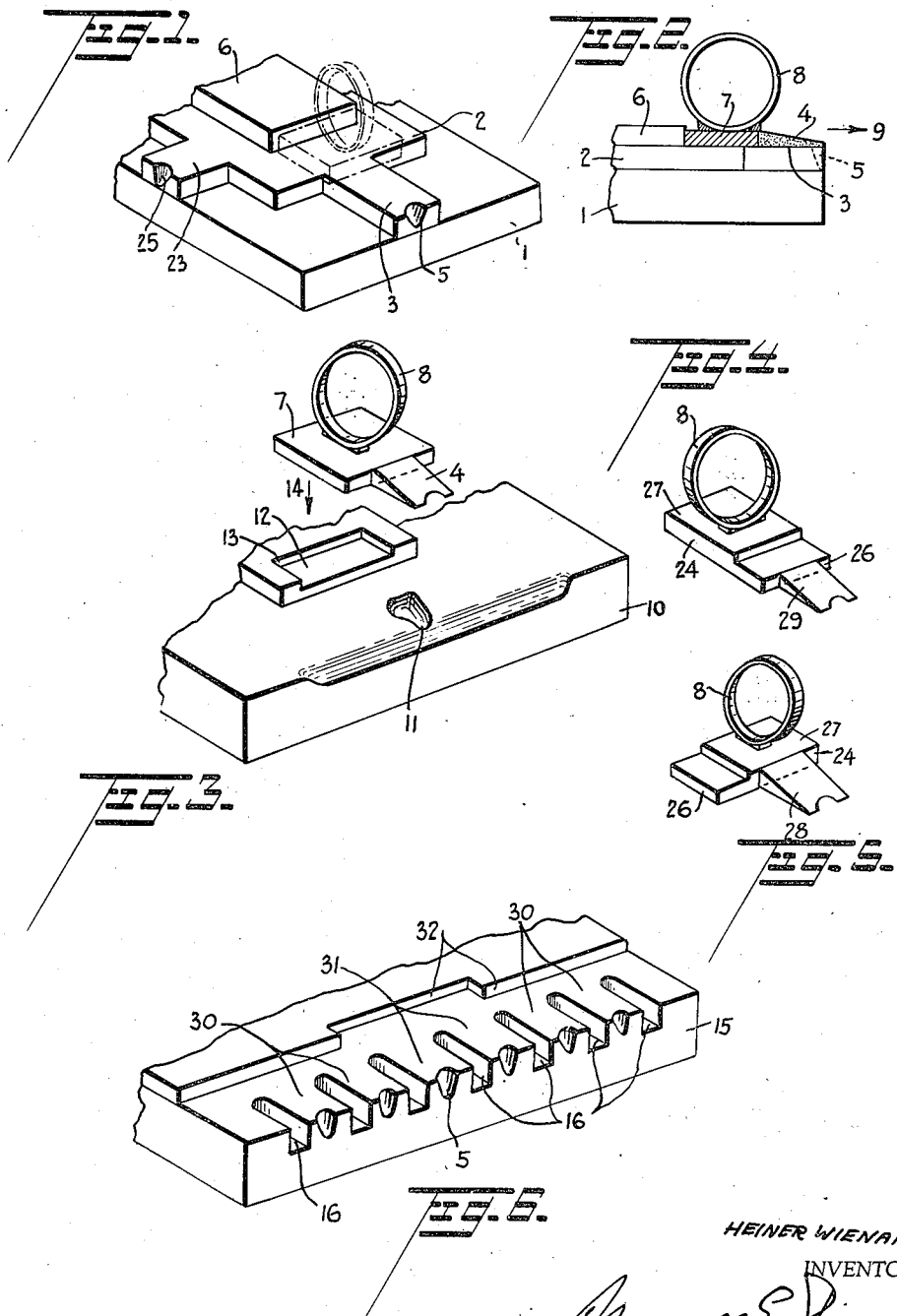
HEINER WIENAND
INVENTOR.
BY
ATTORNEY.

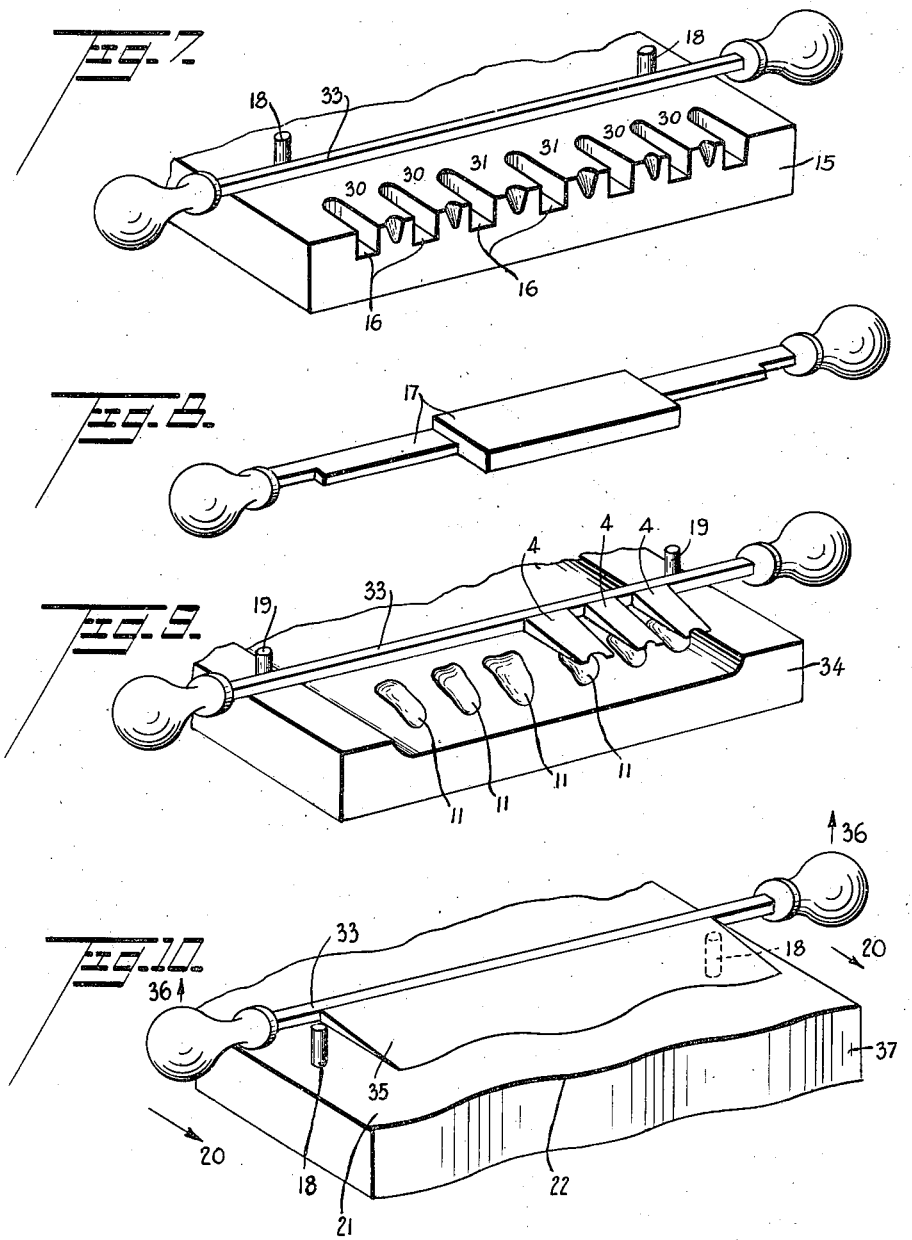

Patented Sept. 2, 1941

2,254,638

UNITED STATES PATENT OFFICE 2,254,638

METHOD AND APPARATUS FOR MOLDING ARTIFICIAL TEETH

Heiner Wienand, Buchschlag, Germany

Application July 12, 1938, Serial No. 218,725
In Germany April 22, 1937

9 Claims. (Cl. 18—5.7)

The invention relates to a method of molding artificial teeth of the kind wherein the visible area of the tooth has differing colour zones attained by partly superimposing differing ceramic masses upon each other. In order to produce the maximum natural appearance these differing shades must be finely blended into each other. This necessitates the outer ceramic layer being pre-molded into a small wedgeshaped blank before placing it in the mold, into which the second ceramic substance is then added. It is evident that all the dimensions of this wedgeshaped blank, especially its width and length as well as its thickness at the blunt end and thus also its gradient, and further also the contour of its sharp edge, are dependent upon the size and shape of the tooth to be produced and upon the desired shading.

As a rule the pre-molding and the applying of the wedgeshaped outer layer is done by hand and even if, as is usual, a complete set of about twelve teeth in two rows is to be cast in one operation, each tooth blank in these rows is made separately. This method is complicated, takes much time and is uneconomic insofar as in the above-mentioned manual work without further aids irregularities may easily arise, which may result in the teeth, after they have been subjected to the heating process, having a different shading from that aimed at. It must also be considered that when producing a complete set of teeth, the teeth appertaining thereto must be of various sizes and colour-gradation, so that also the wedgeshaped small blanks must differ among themselves and yet be pre-molded according to a predetermined scale. In the case of merely manual work this imposes difficult conditions.

In order to assist the inevitable manual work to such an extent that irregularities in execution and resulting scrap are reduced to a minimum, it has already been proposed to pre-mold double-layered blanks from one or two kinds of mineral substances in an auxiliary tool up to a certain degree of finish and then to insert them with the aid of the said tool in the approximately correct position and quantity in the hollow of the die. This apparatus is not satisfactory in a case where the different layers are very finely superimposed upon each other, that is to say that the planes dividing the layers are not steep but must extend at a very acute angle to the area of the tooth.

It has also been proposed to add to the two usual female dies between which the tooth as a whole is pressed and finished, a further mold (auxiliary male die) accurately adapted to both or at least to one, of the above-mentioned female dies and allowing in co-operation with the one or the other of the female dies, of first forming and pressing therein the one partial layer of the tooth to be produced, whereupon the auxiliary mold (male die) is removed and the remaining tooth substance added and pressed upon the already formed first layer with the aid of the other female die, molded and finally joined to the said first layer to form the finished tooth. This method and this apparatus of course result in the production of differently coloured outer layers having a quite gradual blending, but the method is rather complicated, the manufacture of the auxiliary mold is expensive and furthermore, when dealing with ceramic substances, it is not satisfactory in that one layer of the tooth is pressed twice while the remaining tooth substance is submitted to one pressing only. It should be noted that the portion of the substance intended to form the front layer is not molded to its exact shape outside the tooth mold proper and then inserted in its correct position in the tooth mold; it is not until it is inserted in the said mold that it is brought to its correct size. It is true that it has been proposed in connection with this method either first to rough-mold this portion of the substance by hand to the shape of tooth concerned leaving at one end a lump of substance greater than at the other end, bearing in mind the final wedge shape of the blank, or for the purpose of facilitating the work, to cut a section from a wedge-shaped strip of substance and insert the said section in the mold, the excess being squeezed out during the molding. Also in the latter case the exact dimensioning of the front outer layer, and especially the exact contour of the thin edge is not determined until the blank is in the final mold, nor is any device indicated for preparing the approximately wedgeshaped strip of substance.

Furthermore, it has also already been proposed to use an auxiliary mold serving the purpose of pressing the portion of substance intended to form the front layer in a die, not under mechanical pressure but by hand pressure only, in such a manner that the quantity of substance originally placed in this auxiliary mold was given the desired rough shape of the front outer layer, the excess material being at the same time squeezed out. For this purpose the said auxiliary mold component must again be very accurately adapted to the dimensions of the differing hollow molds in the dies corresponding to the varying sizes of teeth, and this again makes production expensive. The final quantity of the substance remaining in the mold is not accurately predetermined, as the pressure under which it is inserted therein varies and because there is no preliminary shaping of this portion of the substance outside the female die. Just as in the case of the first-mentioned methods the auxiliary mold here also serves as a tool for inserting the substance adhering thereto, but the separating of the substance from the inserting tool after the hand pressing process again presents difficulties.

Finally, it has also already been proposed to pre-mold the portion of the substance intended to form the front layer in an entirely separate hollow mold, but in this method it is indeed very difficult to separate the pre-molded blank undamaged from the hollow mold and to transfer it without deforming it to the place of further treatment, i. e. into the tooth mold proper.

Now the aim of the invention is to develop a method and mechanical aids for carrying it out in such a manner that the difficulties mentioned are avoided and that an accurately pre-molded wedge of substance can be produced in a very simple manner outside the dies and dimensioned substantially to correspond to the finished tooth even as regards the contour of the thin edge, the said wedge being then inserted in the prescribed position in the tooth mold by means of a carrier already used in a pre-molding and from which it can be very easily detached.

According to the invention wedges formed of the substance intended to constitute the foundation of the teeth, are first pre-molded by means of an auxiliary molding device against a detachable carrying member, together with which latter the wedges are lifted off the said device and pressed into suitable teeth molds formed on a molding plate. A plurality of identical or differing wedges of the substance are preferably rough-molded side by side against the same wedge carrier, or a strip of wedges for several tooth molds are rough-molded side by side on the molding plate. Further, an assembly of plates with projections attached to a base plate serves as support and dimensioning means for forming the wedges, and a carrier lying detachably against stops on the assembly of plates serves the purpose of pre-forming the wedges. The carrier may for example be in the form of an edged rod, while the stops consist of pegs. The subject matter of the invention is illustrated in the drawings.

Figure 1 shows in perspective and partially broken away a device for manufacturing one single wedge-shaped tooth blank.

Figure 2 shows an elevation, partly broken away, of the same device, the carrier being mounted thereon and also a pre-formed wedge of the tooth substance.

Figure 3 shows again in perspective a portion of the tooth mold proper and above it the movable carrier with the pre-molded wedge adhering thereto.

Figure 4 shows in perspective a modified form of the carrier with pre-formed wedge.

Figure 5 is a view similar to Figure 4 with the carrier rotated through 90 degrees.

Figure 6 is a perspective illustration of a portion of a device for producing a number of wedge-shaped blanks side by side.

Figure 7 shows the same arrangement as in Figure 6 with slight modifications and having a special form of carrier.

Figure 8 shows a modifications in perspective of the carrier intended for producing teeth in sets.

Figure 9 illustrates a female die, partially broken away, intended for the simultaneous production of six teeth, with carrier in position and having three rough-molded wedgeshaped blanks.

Figure 10 shows in perspective a further modification of the device according to the invention with appertaining carrier and a wedgeshaped strip made of the tooth substance and having differing angles of inclination.

On the baseplate 1 of the device shown in Figure 1 and Figure 2, there is fixed a plate 2 having a predetermined depth and a projection 3, the latter forming the support proper upon which the blank wedge 4 is molded.

The projection 3 is formed with a curved notch 5 or the like in or adjacent its front edge and on the upper surface of the plate 2 there is located a further plate 6 the front vertical surface of which acts as a stop for the detachable carrier 7.

This detachable carrier 7 consists in the example shown of a square plate to which a lifting ring 8 is attached. In Figure 1, the part 7 and the said ring 8 are shown only in dotted lines in the position in which they must be placed on the upper surface of the parts 2 and 3 against the locating edge of the plate 6 before the wedge-shaped blank 4 is molded, from the ceramic substance to be used, on the upper surface of the projection 3 with the aid of a small trowel or the like. In Figure 2 this position is clearly indicated.

It is also easy to understand that all the dimensions of the wedge shaped blank 4 are determined by the width of the projection 3, the length of the portion thereof which is not covered by the carrier 7, the thickness of the carrier 7 (height of its front vertical surface) and by the shape of the front edge of the surface of the projection 3 (the notch 5). When the mass is applied by hand to the molding surface according to Figures 1 and 2 so as to conform to the edges of the parts 3, 5 and 7 the wedge-shaped blank 4 so produced can be identically repeated as many times as desired.

The procedure next consists in inserting the wedge 4 in the concave tooth mold proper which determines the shape of the front of the tooth, that is, the side adjacent the lips. Figure 3 shows by way of example a molding plate 10 in which can be seen such a concave mold or rather half-mold, in the shape of a hollow 11. At a predetermined distance from this hollow 11 in the longitudinal axis of the tooth and at a predetermined height in relation thereto, there is arranged a fitting surface 12 limited at the rear by a locating edge 13. The positions of the surface 12 and the edge 13 correspond to the positions of the surfaces of the projection 3 and the stop 6 which co-operate in the pre-molding of the wedge 4.

When, according to Figure 3, the carrier 7 with the wedge 4 is placed in the direction of the arrow 14 upon the surface 12 and brought to bear against the locating edge 13, the wedge 4 will be located quite definitely in relation to the hollow 11, at least as seen in the longitudinal axis of the tooth. It would be an easy matter also to determine the lateral position of the carrier 7 in relation to the hollow 11 but in most cases it will be safe enough to rely upon the eye for this lateral locating.

By means of a slight vertical pressure with a tool or with a finger, the wedge 4 can now be pressed into the hollow 11 in the prescribed position. Excess substance along the edges of the hollow may easily be removed and the second ceramic substance can then be inserted so as completely to fill the hollow 11.

Without departing from the principle of the method just described, the auxiliary means may of course be modified in shape in many ways.

For example, the device may be equipped with an arrangement for the molding of one single form of tooth, or there may be arranged crosswise or radially a plurality of differing projections 3, 23 (Figure 1) having differing notches 5, 25 and differing positions of the locating edges of the part 6 so that even if using the same carrier 7 it is possible to mold wedges of various sizes upon the projections 3, 23. By using different carriers 7 such as carriers having varying thicknesses along their edges or carriers having varying dimensions in various directions between opposite edges, a large number of differing wedges 4 can be pre-molded. This is shown for example in Figure 4 and Figure 5: a plate 27 having edges of various thicknesses 24 and 26 and various transverse dimensions produces, when rotated through 90 degrees, wedges 28 and 29 of different lengths and thicknesses.

Instead of multiplying the single device crosswise or radially according to Figure 1, a rectilinear juxtaposition of differently dimensioned projections 30, 31 may be arranged along a longitudinal baseplate 15 at corresponding intervals 16 as shown in Figures 6 and 7. In this case also the stop is formed in the shape of a straight or stepped strip 32, according to Figure 6 where separate carriers 7 are to be used each for one single wedge 4. However, several such carriers 7 can be combined into a strip 17 according to Figure 8 having a straight or stepped front edge. In that case it will be sufficient to provide for example two locating pins 18 on the base plate 15 according to Figure 7, in order to ensure correct location of the said strip. This strip can be designed as a thin rod 33 of square cross-section as in Figures 7, 9 and 10. On the molding plate according to Figure 9 the surface 12 and the edge 13 (Figure 3) or as the case may be, only the locating edge 13, are replaced by a pair of locating pins 19 or similar stops for locating the rod 33 or the strip 17 (Figure 8) upon which the individual wedges 4 are pre-molded. This takes into consideration that as a rule in such cases the plate 34 is provided, not with one single hollow 11, but, for example, with a row of six such hollows corresponding to a set of six differing tooth shapes.

The procedure may even be such that upon the longitudinally extending molding plate 37 (Figure 10) there are pre-molded, not a plurality of individual wedges 4 side by side, but a continuous strip 35 of wedge shape, made of the suitable ceramic substance. This strip 35 is pushed forward upon the molding plate 37 in the direction of the arrow 20 and then detached upwardly in the direction of the arrow 36, the strip being then transferred to the molding plate 34 and pressed down upon the row of hollows 11 in this molding plate 34 in such a manner that the portions of the strip 35 coinciding with the spaces between the hollows 11 are detached at the edges of the hollows and removed as excess, which latter can be used again immediately.

Where in such a case the front edge of the continuous molding surface 21 upon which the wedge strip 35 of ceramic substance is pre-molded, is straight, the wedges will be purely prismatic in shape. As, however, the wedges to be inserted in the various hollows 11 must have differing lengths where a set of say six teeth comprising incisors and canines is to be shaped simultaneously, these teeth being, as is known, of differing lengths, it may be advisable to shape the front edge of the said molding surface 21 in the form of a curve 22 so as to agree with these varying lengths, so that when the substance is applied between the detachable strip or rod 33 corresponding to the carrier 7 and the curved front edge 22 there is not formed a prismatic wedge of ceramic substance, but a wedge-shaped strip 35 which, although continuous has varying depths and angles of inclination corresponding with the curvatures of the front edge.

What I claim and desire to secure by Letters Patent of the United States is:

1. A method of molding artificial teeth which comprises pre-molding wedges, formed of a substance intended to constitute the foundation of the teeth, on an auxiliary molding device and against a detachable carrier member, removing said wedges from said device by means of said carrier member, pressing said wedges into teeth molds formed on a molding plate and then adding to the said latter molds the remainder of the teeth forming substance.

2. A method of molding artificial teeth which comprises pre-molding, on an auxiliary molding device and against a detachable carrier member, wedges formed side by side and of differing shapes, the said wedges being composed of the substance constituting the foundation of the teeth, removing said wedges from said device, by means of said carrier member, pressing said wedges into teeth molds formed on a molding plate and then adding to the said latter molds the remainder of the teeth forming substance.

3. A method of molding artificial teeth which comprises pre-molding a wedge-shaped strip, formed of a substance intended to constitute the foundation of the teeth, on an auxiliary molding device and against a detachable carrier member, removing said strip from said device by means of said member, pressing said strip into teeth molds formed on a molding plate and then adding to the said latter molds the remainder of the teeth forming substance.

4. An auxiliary molding device for use in the molding of artificial teeth comprising a baseplate, a further plate superimposed on the said baseplate and formed with molding surfaces, a locating member on said latter plate and a carrier member, the said carrier member being positioned on the said latter plate by means of said locating member.

5. An auxiliary molding device for use in the molding of artificial teeth comprising a baseplate, a further plate superimposed on said baseplate and formed with molding surfaces, a stop member on said latter plate and a carrier member adapted to be positioned on said latter plate by means of said stop member, the said carrier member having edges of varying thickness.

6. An auxiliary molding device for use in the molding of artificial teeth comprising a baseplate formed with molding surfaces arranged thereon at suitable intervals, a locating strip arranged on said baseplate and carrier members adapted to be positioned on said baseplate by means of said locating strip.

7. An auxiliary molding device for use in the molding of artificial teeth comprising a baseplate, a continuous and non-uniform molding surface formed on the said baseplate, stop members arranged on said baseplate and a carrier member in the form of an edged strip, the said strip being adapted to be positioned on the said baseplate by means of the said stop members.

8. An auxiliary molding device for use in the molding of artificial teeth comprising a baseplate, molding surfaces of varying dimensions formed on said baseplate at suitable intervals, locating pins attached to said baseplate and a carrier member in the form of an edged rod of rectangular cross-section, the said rod being adapted to be positioned on the said baseplate by means of said locating pins.

9. An auxiliary molding device for use in the molding of artificial teeth comprising a baseplate, a further plate superimposed on said baseplate and formed with a projection constituting a molding surface, a locating member attached to said latter plate and a carrier member, the said carrier member being positioned on the said latter plate by means of said locating member.

HEINER WIENAND.